United States Patent [19]

Kiyohara

[11] Patent Number: 4,878,069

[45] Date of Patent: Oct. 31, 1989

[54] INK JET RECORDING APPARATUS WITH AN INK TANK-CARRIAGE CONFIGURATION FOR INCREASING USEABLE SPACE

[75] Inventor: Takehiko Kiyohara, Zama, Japan

[73] Assignee: Canon Kabushiki Kaisha, Tokyo, Japan

[21] Appl. No.: 237,641

[22] Filed: Aug. 26, 1988

Related U.S. Application Data

[63] Continuation of Ser. No. 82,946, Aug. 10, 1987, abandoned, which is a continuation of Ser. No. 752,538, Jul. 8, 1985, abandoned.

[30] Foreign Application Priority Data

Jul. 9, 1984 [JP] Japan ............................... 59-140744

[51] Int. Cl.⁴ ........................... G01D 15/16; B41J 3/04

[52] U.S. Cl. .............................................. 346/140 R

[58] Field of Search ........................................ 346/140

[56] References Cited

U.S. PATENT DOCUMENTS

| | | | |
|---|---|---|---|
| 4,015,272 | 3/1977 | Yamamori | 346/140 |
| 4,119,034 | 10/1978 | Wax | 346/140 X |
| 4,156,244 | 5/1979 | Erikson | 346/140 |
| 4,253,103 | 2/1981 | Heinzl et al. | 346/140 |
| 4,277,791 | 7/1981 | Rosenstock et al. | 346/140 |
| 4,306,245 | 12/1981 | Kasugayama | 346/140 |
| 4,320,406 | 3/1982 | Heinzl | 346/140 |
| 4,367,482 | 1/1983 | Heinzl | 346/140 |
| 4,419,678 | 12/1983 | Kasugayama | 346/140 |
| 4,432,005 | 2/1984 | Duffield | 346/140 |
| 4,484,202 | 11/1984 | Sayko | 346/140 |
| 4,511,906 | 4/1985 | Hara | 346/140 |
| 4,575,736 | 3/1986 | Roschlein | 346/140 |
| 4,586,058 | 4/1986 | Yamazaki | 346/140 R |

*Primary Examiner*—Joseph W. Hartary
*Attorney, Agent, or Firm*—Fitzpatrick, Cella, Harper & Scinto

[57] ABSTRACT

An ink jet recording apparatus has a recording head and replaceable ink container carried by a carriage. The ink container is inserted into the carriage and positioned such that it is bodily inclined with respect to the carriage in a normal state of operation. When the ink container is so positioned, two hollow spaces are formed between the ink container and the carriage. A first space may be used for accommodating electric circuits associated with the recording head and a second space may be used to accommodate a guide portion of the carriage. Additional features include an ink absorbing material on a bottom surface of the carriage and a portion of the ink container which is folded upon breakage which occurs when the carriage is inserted into the carriage.

16 Claims, 1 Drawing Sheet

INK JET RECORDING APPARATUS WITH AN INK TANK-CARRIAGE CONFIGURATION FOR INCREASING USEABLE SPACE

This application is a continuation of application Ser. No. 082,946 filed 8/10/87, now abandoned; which was a continuation of application Ser. No. 752,538 filed 7/8/85, now abandoned.

BACKGROUND OF THE INVENTION

1. Field of the Invention

The present invention relates to an ink jet recording apparatus and more particularly to an improvement of an ink jet recording apparatus of the type in which one or more of a plurality of ink containers are replaceably fitted into a carriage.

2. Description of the Prior Art

As is well known, ink jet recording apparatus have characterizing features wherein printing is effected with the generation of a noise level which is kept lower than that of wire dot type or heat sensitive type recording apparatus. An ink jet apparatus may be suitably employed for printing at a high speed. Moreover, color printing is easy to be achieved. For the above reasons it is preferably used for an output device of electronic apparatus in the form of a printer, facsimile apparatus or the like.

The ink jet recording apparatus is generally constructed such that ink held in the ink containers is introduced into the recording head and it is then injected from ink discharging orifices toward a recording medium (e.g. paper) by activating an ink discharging energy generator disposed on the recording head in response to a printing pattern signal (recording signal). The ink discharging energy generator is adapted to generate energy required for discharging liquid (ink) from the ink discharging orifices. Thus, dot printing is effected by repeatedly injecting ink toward the recording medium.

To avoid connection of ink containers to the recording head by using long feeding tubes a recording apparatus of the above-mentioned type is often so constructed that ink containers are replaceably mounted on a carriage adapted to move along the recording medium together with a recording head disposed on the carriage. As a result, the recording apparatus can be designed in smaller dimensions.

In a conventional ink jet recording apparatus, a substantially rectangular cartridge type ink container is mounted on the carriage by inserting it from above or from the back side relative to the carriage.

On the other hand, the carriage is provided with electric circuits for turning on the recording head to activate the energy generator and a guide section for displaceably supporting the carriage. To allow the electric circuits and the guide section to be accomodated in a limited space on the carriage a variety of proposals have been already made from the design viewpoint.

However, since the conventional recording apparatus is so constructed that each of the ink containers is replaceably mounted horizontally in the above-described manner, it is difficult to keep the space required for accomodating therein electric circuits and making electric connection therebetween when the recording apparatus is designed in smaller dimensions. Another problem of the conventional recording apparatus is that there is a necessity for forming projections in order to build the guide section which serves to displaceably support the carriage, resulting in the design of the recording apparatus in a compact structure being achieved only with much difficulty.

Yet another problem with the conventional recording apparatus is that ink held in each of the ink containers cannot be fully consumed in spite of the fact that an ink intake port is located at the position in the proximity of the bottom of the ink container, because the bottom of the ink container is flat and moreover it is held horizontally.

SUMMARY OF THE INVENTION

Hence, the present invention has been made with the foregoing problems in mind.

It is an object of the present invention to provide an improved ink jet recording apparatus of the previously mentioned type which assures that a space in the carriage is utilized in the optimum manner by forming two hollow spaces at both the upper and lower parts of the carriage to accomodate electric circuits in the one hollow space and to build a guide section in the other hollow space.

It is another object of the present invention to provide an improved ink jet recording apparatus of the previously mentioned type which assures that ink stored in each of the ink containers is fully used.

It is another object of the present invention to provide an improved ink jet recording apparatus which is constructed with a compact structure and in which each of the ink containers can be easily fitted into the carriage.

It is a further object of the present invention to provide an improved ink jet recording apparatus of the previously mentioned type which assures that each of the ink containers is replaceably fitted into the carriage in such an inclined state that the rear side is raised above the fore side thereof.

To accomplish the above objects there is proposed, according to the present invention, an ink jet recording apparatus of the type in which a recording head is carried on a carriage adapted to move along a recording medium and ink stored in a plurality of ink containers is introduced into the recording head so that ink is injected through a plurality of ink discharging orifices toward the recording medium by activating an energy generator disposed on the recording head in response to a recording signal, the energy generator serving to generate energy which is utilized for the purpose of discharging ink, wherein the improvement consists in that the ink containers are replaceably fitted into the carriage in such an inclined state that the rear side is raised above the fore side thereof.

When the ink containers are fitted into the carriage, two hollow spaces are formed at both the upper and lower parts of the carriage. One of them is utilized to accommodate electric circuits and the other one is utilized to house a guide section for displaceably supporting the carriage. Thus, the space of the carriage can be utilized in the optimum manner.

Since each of the ink containers is fitted in the inclined posture, ink stored therein can be fully consumed.

By virtue of arrangement of the recording apparatus made in that way it can be designed and constructed in smaller dimensions with useles space being reduced substantially.

Other objects, features and advantages of the present invention will become more clearly apparent from reading of the following description which has been prepared in conjunction with the accompanying drawings.

BRIEF DESCRIPTION OF THE DRAWINGS

The accompanying drawings will be briefly described below.

DESCRIPTION OF THE PREFERRED EMBODIMENT

Now, the present invention will be described in greater detail hereunder with reference to the accompanying drawings which illustrate a preferred embodiment thereof.

Figure 1:
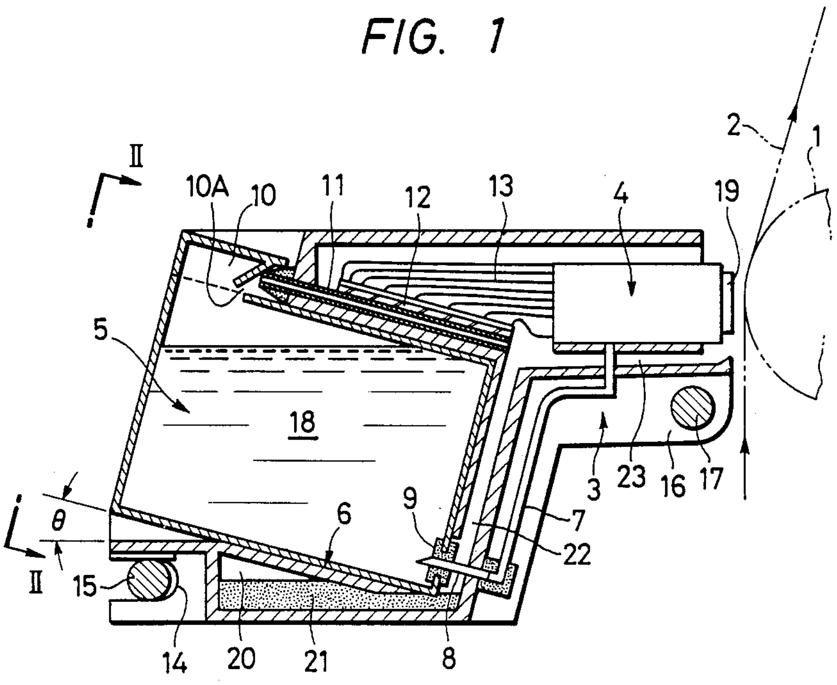
FIG. 1 is a vertical sectional view of an ink jet recording apparatus in accordance with an embodiment of the invention.
Figure 2:
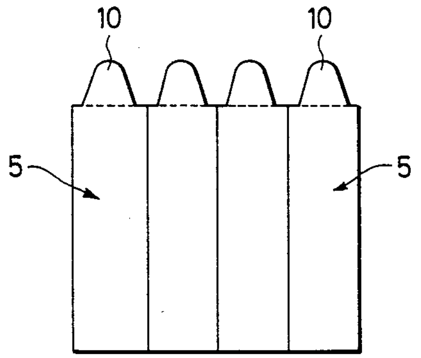
FIG. 2 is a front view of the apparatus as seen from line II—II in FIG. 1.

FIG. 1 is a vertical sectional view of a carriage on which a plurality of ink containers are mounted. A recording head 4 and a plurality of ink containers 5 are mounted on the carriage 3 adapted to move along a recording material (paper) 2 which is brought in contact with a platen 1. In the illustrated embodiment, as can be seen in FIG. 2, the apparatus is shown to include the number (four) of recording heads 4 to effect color printing and the same number (four) of ink containers 5 as that of the recording heads 4.

As is apparent from the drawing, each of the ink containers 5 in each of container fitting sections 6 in such an inclined state that it is turned by a certain angle in the clockwise direction as seen in the drawing. The container fitting section 6 is designed in the cavity-shaped configuration of which the left-hand side is raised above the right-hand side as seen in the drawing.

The container fitting section 6 has a hollow needle 8 fixedly secured thereto which is in communication with the recording head 4. As will be readily understood from the drawing, an ink intake hole 9 is formed by piercing the hollow needle 8 through an intake portion on the container 5 in connection with fitting operation of the container.

In the illustrated embodiment the container 5 has a folding portion at the position located in the fore part of an upper projection 10 and an air vent hole 10A is formed by breaking the folding portion under the effect of a thrusting force provided by a thrusting portion on the foremost end of a communication tube 11 which is fitted through the wall of the carriage 3. It should be noted that breaking of the folding portion is achieved in connection with the fitting operation of the container. The air vent hole 10 communicates with the outside atmosphere via the communication tube 11.

Since the ink container 5 is fitted in such an inclined posture that it is turned by a predetermined angle of $\theta$ in the clockwise direction as seen in the drawing, hollow spaces having the substantially triangular sectional configuration are formed at the upper fore part of the carriage as well as at the lower rear part of the same. In the illustrated embodiment the hollow space located at the upper fore part of the carriage 3 serves to accomodate therein a circuit base board 12 with an electric circuit for turning on the recording head 4 arranged thereon and other electronic components such as flexible circuits 13 or the like. On the other hand, the hollow space located at the lower rear part of the carriage 3 serves to build a guide portion 14 for displaceably supporting the carriage 3.

Thus, the carriage 3 is ready to move in the leftward or rightward direction (in the vertical direction as seen relative to the plane of the drawing) with the aid of a guide shaft 15 extending through the guide portion 14 and another guide shaft 17 extending through the fore guide portion 16. Ink 18 held in the ink container 5 is introduced into the recording head 4 via the hollow needle 8 and the ink feeding tube 7. In response to printing pattern signals transmitted from the electric circuits 12 and 13 a plurality of discharging orifices on the recording head 4 (identified by a plurality of recording head chips 19 in the drawing which constitute the discharging orifices each of which is in operative association with an energy generator) become activated whereby ink is injected toward the recording material 2 to effect ink dot printing.

As in apparent from FIG. 1, the apparatus is provided with a waste ink reservoir 20 in the bottom area of the carriage 3 and an ink absorbing material 21 is placed in the waste ink reservoir 20. The latter is communicated with the air vent hole 10A via the communication tube 11 and the passage 22 which in turn is communicated with the lower part of the recording head chips 29 via a passage 23 disposed below the recording head 4. Thus, ink leaked from the air vent hole 10A and waste ink leaking from the discharging orifices or dripping from the recording head chips 19 is introduced into the waste ink reservoir 20 and it is then absorbed in the ink absorbing material 21.

As described above, the apparatus of the invention is so constructed that a plurality of ink containers 5 are fitted into the carriage 3 in the inclined posture and hollow spaces having the substantially triangular sectional configuration are formed at both the upper and lower parts of the carriage 3 so that electric circuits 12 and 13 for turning on the recording head 4 are accomodated in the upper hollow space and a guide portion 14 is commodated, for the purpose of supporting the carriage 3, in the lower hollow space. As a result, the apparatus has an advantageous feature that a limited space in the carriage 3 can be utilized in the optimum manner.

Further, since the ink intake hole 9 is located at the position in the proximity of the lowermost part of the bottom of the ink containers 5 which are fitted into the carriage 3 in the inclined posture, ink stored in the containers can be fully taken out therefrom without any loss.

In the illustrated embodiment four ink containers are mounted on the carriage but the present invention should not be limited only to this. Alternatively, the present invention may be applied to the case where a single container is mounted for a monochromatic printer or the case where more than four ink containers are mounted on the carriage in the above-described manner.

It should, of course be understood that the present invention should not be limited only to the foregoing embodiments but various changes or modifications may be made in any acceptable manner without departing from the spirit and scope of the invention as defined by the appended claims.

Incidentally, no description has been made above with respect to the energy generator but any well known means, for instance, a converter adapted to convert electric energy into thermal energy (heating element or the like) in the case where thermal energy is utilized and a converter adapted to convert electric energy to mechanical energy (piezo-electric element, magnetostriction element or the like) in the case where mechanical energy is utilized may be employed for the apparatus, provided that liquid (ink) can be injected from ink discharging orifices in response to recorded information with the aid of the energy generator.

What is claimed is:

1. An ink jet recording apparatus having a recording head carried on a carriage adapted to move along a recording material and an ink container for storing ink, said ink container having a foreside and a rearside relative to an outlet port of said ink container, ink being introduced into said recording head so as to be injected through an ink discharging orifice toward said recording material by activating an energy generator disposed on said recording head in response to a recording signal, said energy generator serving to generate energy which is utilized for the purpose of discharging ink, and said ink container being replaceably fitted into said carriage in an inclined state such that its rearside is raised above its foreside, wherein:

said ink container has a folding portion adapted to be folded by breakage when it is fitted into said carriage, said folding portion, in a folded state, serving to establish communication between the interior of said ink container and the outside atmosphere, said carriage is provided with a thrust portion for breaking said folding portion under the effect of a thrusting force provided by said thrust portion, said thrust portion of said carriage including a communication tube through which communication is established between the interior of the said ink container and the outside atmosphere, and one end of said communication tube is in communication with an ink absorbing material on a bottom surface of said carriage.

2. An ink jet recording apparatus comprising a carriage movable along a recording medium, an ink tank for holding ink, said ink tank being removably mountable to said carriage in an inclined orientation with respect to the horizontal, and a recording head mounted on said carriage and having an energy generating member responsive to a recording signal for generating energy to discharge ink from said ink tank through one or more orifices in said recording head toward a recording medium, wherein:

said ink tank has a folding portion adapted to be folded upon breakage which takes place when said ink tank is inserted into said carriage, said folding portion serving to establish communication, in the folded state, between the interior of said ink tank and the ambient atmosphere;

said carriage includes a thrust portion for breaking said folding portion under the effect of a force provided by said thrust portion when said ink tank is inserted in said carriage;

said thrust portion on said carriage includes a communication tube which cooperates with said folding portion to establish communication between the interior of said ink tank and the ambient atmosphere; and one end of said communication tube is directed to an ink absorbing material disposed on a bottom surface of said carriage.

3. An ink jet recording apparatus according to claim 2, wherein said communication tube communicates with a passage through which ink dripping from said ink discharging orifices of said recording head carried on the carriage and through which waste ink flows downwardly.

4. An ink jet recording apparatus comprising:

a carriage movable along a recording medium, said carriage having a mounting section;

a recording head supported by said mounting section;

a substantially rectangular ink tank for holding ink, said ink tank having an outlet port and being removably mounted in a mounting direction, said tank being supported by said mounting section in an inclined orientation with respect to the horizontal and at a predetermined angle with respect to said carriage, with said outlet port being on a front side of said ink tank in the mounting direction; and an ink absorbing member disposed in said carriage for retaining waste ink, said mounting section having a take-out member disposed proximate to said front side of said ink tank and below said carriage for receiving ink through fluid communication with said ink tank outlet port, and an ink tank guide support surface inclined downwardly toward said ink take-out member, wherein said ink absorbing member collects waste ink from said outlet port.

5. An ink jet recording apparatus according to claim 4, wherein said carriage has a plurality of recording heads, an ink tank corresponding to each said recording head disposed in said mounting section, and an ink absorbing member corresponding to each said ink tank.

6. An ink jet recording apparatus according to claim 4, wherein said ink absorbing member absorbs waste ink guided along a guide route which is provided on said carriage and guides said waste ink from said recording head, said ink absorbing member being provided horizontally.

7. An ink jet recording apparatus according to claim 6, wherein said outlet port is provided on said guide route so as to cause the waste ink from said recording head to be guided to said ink absorbing member therethrough.

8. An ink jet recording apparatus according to claim 7, further comprising guiding rails for guiding said carriage, wherein one of said guiding rails is located below said ink tank guide support surface and at an opposite side of said support surface from said ink take-out member.

9. An ink jet recording apparatus according to claim 4, wherein said recording head has a plurality of discharge orifices for discharging ink and electrothermal converters for generating thermal energy, with one of said electrothermal converters being provided for each orifice.

10. An ink jet recording apparatus comprising:

a carriage movable along a recording medium, said carriage having a mounting section;

a plurality of recording heads supported by said mounting section;

a plurality of substantially rectangular ink tanks for holding ink, said ink tanks each having an outlet port and being removably mounted in a mounting direction, said ink tanks being supported by said mounting section in an inclined orientation with respect to the horizontal and at a predetermined angle with respect to said carriage, with said outlet port being on respective front sides of said ink tanks in the mounting direction; and an ink absorbing member disposed in said carriage for retaining waste ink, said mounting section having a plurality of ink take-out members, with one of said take-out members being disposed proximate to said front side of each said ink tank and below said carriage for receiving ink through fluid communication with said respective ink tank outlet ports, and an ink tank guide support surface sloping downwardly toward said ink take-out members, wherein said ink absorbing member absorbs waste ink guided along a guide route which is provided on said carriage and guides the waste ink from said recording head, said ink absorbing member being provided horizontally, and wherein said ink absorbing member collects waste ink from said outlet ports.

11. An ink jet recording apparatus according to claim 10, wherein said outlet ports provided on said guide route cause said waste ink from said recording heads to be guided to said respective ink absorbing members therethrough.

12. An ink jet recording apparatus according to claim 11, further comprising guiding rails for guiding said carriage, wherein one of said guiding rails is located below said ink tank guide support surface and at an opposite side of said support surface from said ink take-out member.

13. An ink jet recording apparatus according to claim 10, wherein each said recording head has a plurality of discharge orifices for discharging ink and electrothermal converters for generating thermal energy, with one of said electrothermal converters being provided for each orifice.

14. An ink jet recording apparatus comprising:

a carriage movable along a recording medium, said carriage having a mounting section;

a recording head supported on said mounting section;

a substantially rectangular ink tank for holding ink, said ink tank having an outlet port and being removably mounted in a mounting direction, said tank being supported by said mounting section in an inclined orientation with respect to the horizontal and at a predetermined angle with respect to said carriage, with said outlet port being on a front side of said ink tank in the mounting direction; and an ink absorbing member disposed in said carriage for retaining waste ink, said mounting section having an ink take-out member disposed proximate to said front side of said ink tank and below said carriage for receiving ink through fluid communication with said ink tank outlet port, and an ink tank guide support surface sloping downwardly toward said ink take-out member, wherein said ink absorbing member absorbs waste ink guided along a guide route provided on said carriage and guides the waste ink from said recording head, said ink absorbing member being provided horizontally and said outlet port being provided on said guide route to cause said waste ink from said recording head to be guided to said ink absorbing member therethrough, and wherein said ink absorbing member collects waste ink from said outlet port.

15. An ink jet recording apparatus according to claim 14, wherein said recording head has a plurality of discharge orifices for discharging ink and electrothermal converters for generating thermal energy, with one of said electrothermal converters being provided for each orifice.

16. An ink jet recording apparatus according to claim 14, wherein said ink absorbing member is disposed on a bottom surface of said carriage.

* * * * *

UNITED STATES PATENT AND TRADEMARK OFFICE

CERTIFICATE OF CORRECTION

PATENT NO. : 4,878,069

DATED : October 31, 1989

INVENTOR(S) : TAKEHIKO KIYOHARA

It is certified that error appears in the above-identified patent and that said Letters Patent is hereby corrected as shown below:

ON THE TITLE PAGE,
IN [57] ABSTRACT

Line 14, "the carriage" (first occurrence) should read --the ink container--.

COLUMN 1

Line 19, "apparatus" should read --apparatuses--.
Line 25, "reasons" should read --reasons,--.
Line 57, "accomodated" should read --accommodated--.
Line 64, "accomodating" should read --accommodating--.

COLUMN 2

Line 21, "accomodate" should read --accommodate--.
Line 67, "useles" should read --useless--.

COLUMN 3

Line 54, "air vent hole 10" should read --air vent hole 10A--.
Line 63, "accomodate" should read --accommodate--.

UNITED STATES PATENT AND TRADEMARK OFFICE

CERTIFICATE OF CORRECTION

PATENT NO. : 4,878,069

DATED : October 31, 1989

INVENTOR(S) : TAKEHIKO KIYOHARA

It is certified that error appears in the above-identified patent and that said Letters Patent is hereby corrected as shown below:

COLUMN 4

Line 19, "in" should read --is--.
Line 25, "recording head chips 29" should read --recording head chips 19--.
Line 39, "comodated" should read --commodated--.
Line 40, "commodated," should read --accommodated,--.
Line 59, "course" should read --course,--.
Line 66, "well" should read --well- --.

Signed and Sealed this

Twenty-third Day of July, 1991

Attest:

HARRY F. MANBECK, JR.

*Attesting Officer*

*Commissioner of Patents and Trademarks*